United States Patent [19]

Kendall

[11] Patent Number: 5,135,894
[45] Date of Patent: Aug. 4, 1992

[54] PARTICULATE CERAMICS MATERIALS AND PRODUCTION THEREOF

[75] Inventor: Kevin Kendall, Runcorn, United Kingdom

[73] Assignee: Imperial Chemical Industries PLC, London, England

[21] Appl. No.: 506,179

[22] Filed: Apr. 9, 1990

[30] Foreign Application Priority Data

Apr. 10, 1989 [GB] United Kingdom ............... 8907993

[51] Int. Cl.$^5$ .................................... C04B 35/02
[52] U.S. Cl. .................................... 501/94
[58] Field of Search ............ 264/56, 311; 501/94

[56] References Cited

U.S. PATENT DOCUMENTS 4,624,808 11/1986 Lange .................................... 264/23

Primary Examiner—William R. Dixon, Jr.
Assistant Examiner—Chris Gallo
Attorney, Agent, or Firm—Cushman, Darby & Cushman

[57] ABSTRACT

A process for producing a dried particulate ceramic material in which a cake comprising a dispersion of at least 25% by volume of particulate ceramic material in a liquid medium is subjected to rapid drying. Also, a dried particulate ceramic material which may be dispersed in a liquid medium to form a dispersion containing at most only a small proportion of aggregates of the primary particles of the ceramic material.

13 Claims, No Drawings

PARTICULATE CERAMICS MATERIALS AND PRODUCTION THEREOF

This invention relates to particulate ceramic materials and to the production thereof, and in particular to the production of such materials in which only a low proportion of primary particles, if any, are aggregated into particles of substantially larger size.

Particulate ceramic materials, that is particulate materials which may be compacted together and heated in order to sinter the particles to each other and form a shaped article, may be produced by several methods. For example, such particles may be produced by a precipitation method in which a liquid compound of the metal of the desired ceramic material, or a solution of a compound of the metal of the desired ceramic material, may be mixed with a liquid medium with which the compound reacts to form the ceramic material, the liquid compound, or the solution, and the liquid medium being vigorously agitated during the mixing stage in order to produce a ceramic material of small particle size. Such a precipitation method is generally used to produce oxide ceramic materials, for example, alumina, titanium dioxide and silica. Thus, aluminium chloride, titanium tetrachloride or silicon tetrachloride may be mixed with water to form an aqueous dispersion of a hydrated form of alumina, titanium dioxide or silica, the hydrated oxides may be heated in a calcining furnace to remove water, and the oxides may be ball-milled to produce a fine powder. Particulate ceramic materials may also be produced by a vapour phase process in which a volatile compound of the metal of the desired ceramic material is passed through a plasma, e.g. an oxygen plasma, in which the compound is converted to the desired ceramic material. For example, titanium tetrachloride may be reacted in an oxygen plasma in order to produce titanium dioxide. The titanium dioxide powder which is produced may be collected on a filter. Other production methods may be used to produce non-oxide ceramic materials. For example, carbides and nitrides may be produced by a carbothermic reaction in which an oxide of the metal of the desired ceramic material in particulate form may be mixed with particulate carbon, e.g. carbon black or graphite, and the mixture heated either in an inert atmosphere in the case where a metal carbide is to be produced or in an atmosphere of nitrogen or of a reactive nitrogen compound, e.g. of ammonia, in the case where a metal nitride is to be produced. The ceramic material which is produced may be ball-milled in order to produce a fine powder.

Many other methods are known in the art for producing particulate ceramic materials and it is not necessary to describe such methods here. However, most production processes involve a stage in which the particles are dry ball-milled or a dispersion of particles in a liquid medium is ball-milled and the ball-milled dispersion is dried, e.g. by spray-drying or freeze-drying.

The sizes of the particles of ceramic material, and in particular the size distribution of the particles of ceramic material, depend at least to some extent on the method by which the particles are produced. For example, where particles of titanium dioxide are produced by reaction of a volatile compound of titanium in an oxygen plasma the sizes of the particles may vary over a broad range, e.g. 0.1 to 1 micron or more. On the other hand, where particles of silica are produced by precipitation from a solution of a silicon alkoxide the sizes of the particles may vary over a much narrower range, e.g. over a range of 0.20 to 0.23 micron.

Where sintered shaped articles are produced from particulate ceramic materials the strengths of the shaped articles, and in particular the flexural and tensile strengths, are dependent to a substantial extent on the size distribution of the particles of ceramic material. For example, where the size distribution of the particles varies over a very broad range, for example, from sub-micron particle sizes up to particle sizes of several tens of microns the strengths of articles produced from such particulate ceramic materials will generally be low and will be very substantially less than the theoretical maximum strength, even when steps are taken to increase the strength, for example, by prolonged sintering in an attempt to increase the density of the article to a value approaching the theoretical maximum density. Microscopic examination of such shaped articles indicates the presence of substantial flaws in the articles which are believed to be the cause of the undesirably low strengths of the articles. The flaws may be in the nature of cracks in the shaped article, which may be visible, especially on microscopic examination, or the flaws may be present at grain boundaries in the shaped article.

Where the size distribution of the particles of ceramic material varies over a much narrower range it is found that articles produced from such materials are generally of higher strength although even in this case the strength may not be as great as may be desired, and it may still be substantially less than the theoretical maximum strength. Microscopic examination of the shaped articles indicates, somewhat unexpectedly, the presence of flaws in the shaped article which accounts, at least in part, for the low strength.

We have found that, although the size distribution of the particles in a sample of the ceramic material may vary over a narrow range, that is the size distribution of the primary particles in a sample of the ceramic material may vary over a narrow range, a substantial proportion of the primary particles may be aggregated into larger size particles, and we believe that it is the presence of these aggregates of primary particles which is the cause of at least some of the flaws in the shaped article, and thus of the relatively low strength of the shaped article. The strength may not be as great as may be desired and it may be substantially less than the theoretical maximum strength.

For example, we have found that where the particulate ceramic material is produced by drying of a dispersion of the particles in a liquid medium in which the particles are well dispersed and unaggregated and of substantially the same size, the dried particles which are produced by heating the dispersion or by spray-drying or freeze-drying the dispersion, may contain a substantial proportion of aggregated primary particles. The aggregation of the primary particles appears to take place during the drying stage. The aggregation of the primary particles may be demonstrated by redispersing the dried particles in a liquid medium and examining the redispersed particles. The redispersed particles are generally found to contain a substantial proportion of relatively large size aggregates of primary particles. Although the aggregated particles may be broken down at least to some extent, for example, by vigorous agitation of the dispersion, or by application of a shear force to the dispersion, e.g. by ultrasonic agitation or by ball-milling of the dispersion, it is generally not possible to break down all the aggregated particles. Furthermore, even though the aggregated particles which are present may be removed from the dispersion, e.g. by sedimentation, we have found that drying of the dispersion again results in the formation of a substantial proportion of relatively large size aggregates of primary particles.

The present invention relates to a method by which dried particulate ceramic material may be produced which may be substantially free of relatively large size aggregates of the primary particles and from which high strength sintered ceramic shaped articles may be produced, and to a dried particulate ceramic material which may be substantially free of relatively large size aggregates of the primary particles.

According to the present invention there is provided a process for producing a dried particulate ceramic material by drying a dispersion of particulate ceramic material in a liquid medium in which the dispersion which is dried is in the form of a cake containing at least 25% by volume of particulate ceramic material and the dried particulate ceramic material is produced by rapid drying of the cake to remove the liquid medium therefrom.

The dried particulate ceramic material may be produced from a fluid dispersion of particulate ceramic material in a liquid medium by a process which may be operated in two stages, in which in a first stage a cake containing at least 25% by volume of particulate ceramic material is formed, for example, by causing or allowing such a cake to form by sedimentation of the particulate ceramic material in the fluid dispersion thereof, and removing the supernatant liquid medium therefrom, and in a second stage forming a dried particulate ceramic material by rapid drying of the cake to remove the remaining liquid medium therefrom.

It is a surprising feature of the process of the invention that provided the particulate ceramic material in the original fluid dispersion is present substantially completely as primary particles with little or no aggregated primary particles the dried particulate ceramic material which is produced in the process may itself be redispersed in a liquid medium, and possibly be subjected to mild agitation or the application of mild shear forces, and that the resultant dispersion either consists substantially completely of primary particles with little or no aggregation of primary particles, or the size of aggregated primary particles, if any, which are present is relatively small. As the dried particulate ceramic material may contain little or no aggregates of primary particles, or any such aggregates which may be present may readily be broken down, sintered shaped articles of very high strength and having a density approaching the theoretical maximum density may readily be produced from the dried particulate ceramic material produced in the process of the invention.

The process of the invention will now be described with reference to the aforementioned two stage process in which in a first stage a cake containing at least 25% by volume of particulate ceramic material is formed, for example, by causing or allowing such a cake to form by sedimentation of the particulate ceramic material in the fluid dispersion thereof, and removing the supernatant liquid medium therefrom, and in a second stage a dried particulate ceramic material is formed by rapid drying of the cake to remove the remaining liquid medium therefrom.

However, in a preferred embodiment the two stage process is preceded by a preliminary stage in which aggregates of primary particles which may be present in the fluid dispersion which is initially formed are removed therefrom, for example, by subjecting the fluid dispersion to a preliminary sedimentation stage, and separating the bulk of the dispersion from the sedimented aggregated primary particles of ceramic material.

It is clearly desirable that such aggregated particles which may be present in the fluid dispersion are removed from the dispersion prior to formation of the cake in the first stage of the process otherwise the aggregated particles present in the fluid dispersion would also be present in the dried particulate ceramic material produced in the second stage of the process.

The particulate ceramic material in the fluid dispersion thereof in a liquid medium desirably has a mean primary particle size of less than 5 microns, and preferably less than 1 micron. It is preferred that substantially all of the primary particles have a size of less than 5 microns or less than 1 micron as the shaped sintered articles formed from dried particulate ceramic material produced from such particles have high strength and may readily be made with a density approaching the theoretical maximum density.

It may be useful to agitate the fluid dispersion, for example to agitate the dispersion ultrasonically, or to subject the dispersion to shear forces, in order to break down aggregates of primary particles which may be present in the fluid dispersion. However, should any such aggregates remain in the fluid dispersion after agitation of the dispersion it is particularly desirable, for reasons hereinbefore explained, that they be removed from the dispersion in a preliminary stage of the process prior to further processing of the dispersion.

The presence, or absence of such aggregates of primary particles in the dispersion may be detected by examination of the dispersion by optical microscopy and the sizes of the primary particles, and of any aggregates of primary particles which may be present, may be determined, for example, by examination of the dispersion with a Malvern Mastersizer machine.

The liquid medium may be any suitable liquid, and it will be chosen bearing in mind the nature of the particulate ceramic material. For example, although on economic grounds and on the grounds of convenience a preferred liquid medium is water, water would be unsuitable where the particulate ceramic material is reactive with water. In this latter case the liquid medium is suitably an organic liquid which is unreactive with the particulate ceramic material.

The dispersion of particulate ceramic material should be fluid, that is it should be mobile and pourable and the dispersion should not contain such a high proportion of particulate ceramic material that the dispersion is not fluid. On the other hand, in the process of the invention the liquid medium must be removed from the dispersion and it is clearly desirable that the dispersion should not contain an unnecessarily high proportion of liquid medium. For these reasons it is preferred that the fluid dispersion contains at least 5% by volume of particulate ceramic material, preferably at least 10% by volume. In general it will contain not more than 15% by volume of particulate ceramic material.

In order to aid dispersion of the particulate ceramic material it may be desirable that the dispersion contains a dispersing agent in solution in the liquid medium as the presence of such a dispersing agent may assist dispersion of the particulate ceramic material and it may also aid the production of dried particulate ceramic material which contains little or no aggregates of primary particles. The dispersing agent is suitably present in a proportion of 0.1 to 20% by volume of the particulate ceramic material in the dispersion, preferably 1 to 5% by volume. The dispersing agent may be an organic polymeric material. Suitable dispersing agents include water-soluble organic polymeric materials, for example, polyethylene oxide, hydroxypropyl methyl cellulose, polymers and copolymers of acrylamide and methacrylamide, and hydrolysed polyvinyl acetate. Alternatively, the dispersing agent may be a monomeric material of which there are many examples which may be used.

In the first stage of the process of the invention a cake containing at least 25% by volume of particulate ceramic material, and correspondingly not more than 75% by volume of liquid medium, is formed. The cake may be formed by causing or allowing sedimentation of the particulate ceramic material in the fluid dispersion to take place, and removing the supernatant liquid therefrom. The cake may be formed merely by allowing the particles of ceramic material to sediment. However, merely allowing sedimentation to take place to the required extent may take a substantial length of time and in order to speed up this stage of the process sedimentation of the particles may be assisted, e.g. by centrifuging the fluid dispersion.

The consistency of the cake which is formed will depend to some extent on the proportion of liquid medium in the cake. The cake will generally have such a consistency that it is not pourable. It may be quite soft, and in general it will have such a consistency that it is self-supporting.

The production of a dried particulate ceramic material which contains little if any aggregates of primary particles, and particularly little if any aggregates of large size, is assisted by the formation of a cake containing a high proportion of the particulate ceramic material, and for this reason it is preferred that in the first stage of the process of the invention a cake is formed containing at least 40%, more preferably at least 50%, by volume of particulate ceramic material. In general it may be too time consuming and possibly uneconomic, to produce a cake containing more than 60% by volume of particulate ceramic material.

In the second stage of the process the cake which has been produced from the fluid dispersion is rapidly dried in order to remove the remaining liquid medium from the cake. The drying of the cake should be effected rapidly as we find that if the cake is dried slowly, e.g. merely by allowing the remaining liquid medium in the cake to evaporate over a substantial period of time, the resultant dried particulate ceramic material, when redispersed in a liquid medium, may contain a substantial proportion of aggregates of primary particles of relatively large size which cannot be broken down by mild agitation of the dispersion. On the other hand, when the cake is dried rapidly over a short period of time the resultant dried particulate ceramic material, when redispersed in a liquid medium, and possibly after mild agitation of the dispersion, is found to contain little if any aggregates of primary particles, or any such aggregated primary particles which may be present are of relatively small size.

Rapid drying of the cake in the second stage of the process is assisted by comminuting the cake into relatively small pieces prior to the drying step, and by arranging for the cake to contain a relatively low proportion of liquid medium. Comminution of the cake may be effected easily by relatively mild agitation of the cake, for example, by chopping the cake in a bladed mixer. Drying of the cake may be effected by heating the cake, e.g. in an oven at a temperature sufficiently high to result in reasonably rapid evaporation of the liquid medium. The drying may be effected by means of microwave heating, or the drying may be effected by freeze drying the cake, or alternatively, or in addition, liquid medium may be removed from the cake by application of vacuum, especially through a porous medium on which the cake is deposited. As the cake contains a relatively small proportion of liquid medium it may be dried rapidly, particularly when compared with the time required to dry a fluid dispersion of particulate ceramic material which contains a proportion of liquid medium substantially greater than the proportion present in the cake.

It is difficult to be quantitive regarding the nature of the rapid drying which is effected in the second stage of the process, particularly the time required. Several criteria have been mentioned which assist in achieving the rapid drying. However, the drying should be sufficiently rapid that in the dried particulate ceramic material which is produced the proportion of aggregated primary particles, and the sizes thereof, is not substantially greater than the proportion of aggregated particles, if any, and the sizes thereof, in the fluid dispersion from which the dried particulate ceramic material is produced. Such a dried particulate ceramic material may readily be produced from the cake by simple experimentation with the aforementioned drying methods, and by suitable choice of the time for which drying needs to be effected, which may also be determined by simple experimentation.

The particulate ceramic material may be any inorganic particulate material provided the particles of the material can be caused to sinter by application of heat.

Thus, the particulate ceramic material may be an oxide or a mixture of oxides, for example, an oxide of aluminum, calcium, magnesium, silicon, chromium, vanadium, hafnium, molybdenum, thorium, uranium, titanium, or zirconium. The ceramic material may be a carbide or a nitride of, for example, chromium, hafnium, molybdenum, niobium, tantalum, thorium, titanium, tungsten, uranium, zirconium or vanadium, or a nitride of one of these elements. The ceramic material may be silicon carbide, or it may be a silicide or boride.

Within the scope of the term particulate ceramic material there is also included those metals which when in a powdered form can be sintered or fused together by application of heat, that is those metals which are susceptible of processing by the technique of powder metallurgy. Suitable metals include aluminium and its alloys, copper and its alloys, and nickel and its alloys.

The dried particulate ceramic material which is produced in the process of the invention is characterised by the property that when the the material is dispersed in a liquid medium it forms a dispersion, possibly after mild agitation, or by the application of mild shear forces, in which the proportion of aggregates of primary particles, if any, and the sizes thereof, are virtually the same as the proportion of such aggregates, if any, and the sizes thereof, present in the fluid dispersion from which the dried particulate ceramic material is produced, and, in a further embodiment of the invention there is provided a dried particulate ceramic material which, when dispersed in a liquid medium, forms a dispersion in which not more than 10% by volume, preferably not more than 5% by volume, and more preferably not more than 2% by volume, of the particles are in the form of aggregates of the primary particles, it being understood that the aforementioned volumes are the volumes of aggregated primary particles present after mild agitation, or after the application of mild shear forces to the dispersion which may be necessary in order to break down loosely bound aggregates of primary particles.

The primary particles of ceramic material in the dispersion, the sizes and proportion thereof, and the sizes and proportions of aggregated primary particles, if any, may be examined and determined by optical examination of the dispersion, particularly with a Malvern Mastersizer MS1000 machine.

In preferred embodiments of the dried particulate ceramic material of the invention the latter material, when dispersed in a liquid medium, forms a dispersion in which at least 95% by volume of the particles which are present have a size of less than 10 microns. The sizes of the particles depend of course on the sizes of the primary particles present in the fluid dispersion from which the dried particulate ceramic material is produced. However, it is preferred that in the dispersion formed from the dried particulate ceramic material the proportion of particles having a size less than 10 microns is at least 97% by volume of the particles present, more preferably at least 99% by volume, and that in the dispersion which is formed at least 95%, or 97% or 99% by volume of the particles which are present, as the case may be, have a size of less than 5 microns, more preferably less than 2 microns or even less than 1 micron.

The aforementioned embodiments are preferred as the ceramic shaped articles produced from such preferred particulate ceramic materials have strengths which are higher than the strengths of shaped articles produced from particulate ceramic materials which do not have the aforementioned properties.

By way of example of the dried particulate ceramic material of the invention we have subjected an aqueous dispersion of a commercially available titanium dioxide to a process which comprises initial sedimentation and removal of aggregated particles, formation of a cake by centrifuging the dispersion, and rapid drying of the cake to produce a dried particulate material which, when redispersed in water, provided a dispersion in which all the particles had a size in the range 0.1 micron to 2 microns with only 2.7% by volume having a size greater than 1 micron, and in which there were no aggregated particles having a size greater than 2 microns, as determined by the Malvern Mastersizer, MS1000. By way of contrast when the same commercially available dispersion was subjected to initial sedimentation and the supernatant dispersion was dried without formation of a cake the dried particulate material, when redispersed in water, provided a dispersion in which 25% by volume of the particles exceeded 1 micron in size due to the formation of aggregated primary particles and the sizes of these latter particles ranged up to 100 microns with a peak particle size of aggregated particles of 50 microns, indicating substantial aggregation of the primary particles, as determined by the Malvern Mastersizer MS1000. The difference in the size distribution of the particles in these samples of dried particulate ceramic material, and the presence of aggregated particles in the latter sample, was reflected in the flexural strengths of sintered products produced from the samples, in the case of the former a flexural strength of 460MPa and a Weibull modulus of 14 and in the case of the latter a flexural strength of 235 MPa and a Weibull modulus of 8.

The dried particulate ceramic material of the invention may be formed into a shaped article by methods known in the art for producing such articles. For example, the particulate material may be compacted in a mould or slip cast and heated in order to sinter the particles. In a preferred method, which is suitable for use in the production of articles of simple or of complex shape, a composition which suitably has a dough-like consistency and which comprises particulate ceramic material, liquid medium, e.g. water, and an organic polymeric material soluble in the liquid medium, may be subjected to high shear in order to form a homogeneous mixture of the components of the composition, for example by calendering the composition on a twin-roll mill, the composition may be shaped, e.g. by extrusion, by injection moulding or by compression moulding, or by calendering into the form of a sheet, and the shaped composition may be heated to progressively higher temperatures in order to remove the liquid medium, burn off the organic polymeric material, and sinter the particles of ceramic material.

The invention is illustrated by the following examples.

EXAMPLE 1

A commercially available titanium dioxide powder (RSM2, Tioxide Ltd) (Particles A) having a primary particle size in the range 0.1 to 1 micron was mixed with water in a proportion of 20% of powder by volume of the mixture and part of the mixture was charged to a Malvern Mastersizer Machine (MS 1000, Malvern Instruments) and the mixture was agitated for 30 seconds at the maximum ultrasonic agitation setting of the machine. Examination of the resultant dispersion in the machine indicated that 25% by volume of the particles was present as aggregates of primary particles having a size greater than 1 micron and that 6% by volume of the particles were in the form of aggregates having a size greater than 10 microns.

0.1% by volume of a dispersing aid 1-amino-2-propanol, was added to the mixture produced as described above, the mixture was ultrasonically agitated to form a dispersion and the dispersion was allowed to stand for 2 days. The supernatant dispersion was then decanted from the aggregate particles which had sedimented, and the supernatant dispersion was divided into two portions.

A first portion of the dispersion was dried by heating the dispersion in an oven at 90° C. for 12 hours and the resultant cake was crushed to a particulate form (Particles B). When the particles were redispersed in water the dispersion was found on examination in the Malvern Mastersizer Machine to contain 25% by volume of aggregated particles having a size greater than 1 micron.

A second portion of the dispersion was centrifuged at 3000 rpm for 15 minutes to produce a sedimented cake containing 47% by volume of titanium dioxide particles, and the cake was then heated at 90° C. for 2 hours and the dried cake was crushed to a particulate form (Particles C). When the particles were redispersed in water the dispersion was found on examination in the Malvern Mastersizer Machine to contain no aggregated particles having a size above 2.3 microns.

Each of the particles described above (Particles A, B and C) were separately mixed with water and with 80% hydrolysed polyvinyl acetate in a proportion by volume of particles 100, water 12, and hydrolysed polyvinyl acetate 10, and the resultant compositions were separately mixed under conditions of high shear on a twin-roll mill by passing the compositions repeatedly through the nip between the rolls of the mill, each composition was pressed into a 2 mm thick sheet, and each sheet was dried by heating at 90° C. for 120 minutes, the hydrolysed polyvinyl acetate was removed from the sheets by heating the sheets at a rate of increase of temperature of 1° C. min$^{-1}$ over a period of 500 minutes, and the particles in each sheet were sintered by heating the sheets at respectively, 1150° C. for 1 hour, 1300° C. for 1 hour, and 1150° C. for 1 hour.

The sheet produced from Particles C had a flexural strength of 460 MPa, a density of 99% of the theoretical maximum, and a Weibull modulus of 14. By way of comparison the sheets produced from particles A and B had, respectively, flexural strengths of 142 MPa and 235 MPa, densities of 90% and 98% of the theoretical maximum, and Weibull moduli of 8 and 8 respectively.

EXAMPLE 2

A commercially available barium titanate powder (AVX Ltd) was mixed with methyl ethyl ketone in a proportion of 20% of powder by volume of the mixture and the mixture was charged to a Malvern Mastersizer Machine as used in Example 1 and agitated ultrasonically for 30 seconds following the procedure of Example 1. Examination of the resultant dispersion showed that the mean particle size of the barium titanate was 1.51 microns and that 35% by volume of the barium titanate had a particle size of greater than 2 microns.

10% by volume of a polyhydroxy stearic acid dispersing agent (Hypermer KD 1 ICI), was added to the mixture, the mixture was agitated ultrasonically, the mixture was centrifuged for 5 minutes at 1000 rpm and the supernatent dispersion was separated from that part of the dispersion which had been caused to settle out as a result of centrifuging. The supernatant dispersion was then centrifuged for 15 minutes at 4000 rpm to produce a cake which was found to contain 66% by volume of barium titanate.

A part of the cake was redispersed in methyl ethyl ketone and agitated ultrasonically and was found on examination in the Malvern Mastersizer Machine not to contain any particles having a size greater than 1.9 microns.

The rest of the cake was dried by heating in an oven at 80° C. for 1 hour to produce a friable powder. The friable powder was then dispersed in methyl ethyl ketone and was found not to contain any particles having a size greater than 1.9 microns.

EXAMPLE 3

A calcined silica powder made by hydrolysis of tetraethyl orthosilicate was mixed with water in a proportion of 20% of powder by volume of the mixture and the mixture was charged to a Malvern Mastersizer Machine as used in Example 1 and agitated ultrasonically for 30 seconds following the procedure of Example 1. The resultant dispersion contained 44% by volume of particles having a size greater than 1 micron.

1% by volume of polyvinyl alcohol was then added to the mixture, the mixture was agitated ultrasonically for 5 minutes and the dispersion was allowed to stand for 2 weeks, and the supernatent dispersion was separated from the powder which had settled out. Examination of the supernatent dispersion showed that it did not contain any particles having a size greater than 1 micron. The supernatant dispersion was then centrifuged at 5000 rpm for 1 hour to produce a cake containing 60% by volume of silica powder. A part of the cake redispersed in water was found not to contain any particles having a size greater than 1 micron. The rest of the cake was dried by heating in an oven at 90° C. for 1 hour and the resultant solid was crushed to produce a powder. When the powder was redispersed in water it was found not to contain any particles having a size greater than 2 microns.

EXAMPLE 4

A commercially available zirconia powder (TZ3Y, Tosoh) was mixed with the methyl ethyl ketone and with a dispersing agent (Hypermer KD 1-ICI) to form a dispersion containing 10% by volume of dispersing agent and 20% by volume of zirconia powder. The dispersion was agitated ultrasonically for 15 minutes, the dispersion was allowed to stand for 24 hours, and the supernatent dispersion was then separated from the settled powder. Examination of the supernatent dispersion in the Malvern Mastersizer Machine showed that the mean particle size was 0.38 micron and that the maximum particle size was 1 micron.

The supernatent dispersions was then centrifuged at 3000 rpm for 15 minutes to produced a cake containing 40% by volume of zirconia powder and the cake was dried by heating at 90° C. for 1 hour.

When the dried friable powder was redispersed in methyl ethyl ketone and ultrasonically agitated the dispersion was found to contain particles having a mean size of 0.43 micron and a maximum size of 2.5 micron.

I claim:

1. A process for producing a dried particulate ceramic material by drying a dispersion of particulate ceramic material in a liquid medium in which the dispersion which is dried is in the form of a cake containing at least 25% by volume of particulate ceramic material and the dried particulate ceramic material is produced by rapid drying of the cake to remove the liquid medium therefrom.

2. A process as claimed in claim 1 in which the cake is formed from a fluid dispersion of particulate ceramic material in a liquid medium.

3. A process as claimed in claim 2 in which the fluid dispersion contains at least 5% by volume of particulate ceramic material.

4. A process as claimed in claim 3 in which the fluid dispersion contains at least 10% by volume of particulate ceramic material.

5. A process as claimed in anyone of claims 2 to 4 in which the cake is formed by causing or allowing sedimentation of the fluid dispersion to take place and by removing the supernatent liquid from the cake which is formed by sedimentation.

6. A process as claimed in any one of claims 2 to 4 in which in a preliminary stage of the process the fluid dispersion is subjected to a preliminary sedimentation step and the resultant supernatent dispersion is separated from sedimented aggregates of the primary particles of the dispersion.

7. A process as claimed in any one of claims 2 to 4 in which the particulate ceramic material in the fluid dispersion has a primary particle size of less than 5 microns.

8. A process as claimed in claim 7 in which the particulate ceramic material in the fluid dispersion has a primary particle size of less than 1 micron.

9. A process as claimed in any one of claims 1 to 4 in which the liquid medium is water.

10. A process as claimed in any one of claims 1 to 4 in which the dispersion contains a dispersing agent in solution in the liquid medium.

11. A process as claimed in claim 5 in which sedimentation of the fluid dispersion is effected by centrifuging the fluid dispersion.

12. A process as claimed in any one of claims 1 to 4 in which the cake which is rapidly dried contains at least 40% by volume of particulate ceramic material.

13. A process as claimed in any one of claims 1 to 4 in which rapid drying of the cake is effected by subjecting the cake to microwave heating, to freeze drying, or to a vacuum.

* * * * *